United States Patent

[11] 3,612,474

| [72] | Inventor | Clair Laffayette Strohl, Jr. |
|---|---|---|
| | | Waukegan, Ill. |
| [21] | Appl. No. | 823,460 |
| [22] | Filed | May 9, 1969 |
| [45] | Patented | Oct. 12, 1971 |
| [73] | Assignee | Abbott Laboratories |
| | | North Chicago, Ill. |

[54] FLOW CONTROL DEVICE FOR FLEXIBLE TUBES
5 Claims, 11 Drawing Figs.

[52] U.S. Cl. ............................................. 251/9, 24/124
[51] Int. Cl. ............................................. F16k 7/06
[50] Field of Search ................................ 251/4, 7–10; 24/124, 126 C, 136 B

[56] References Cited
UNITED STATES PATENTS

| 563,676 | 7/1896 | McGinnis et al. | 24/124 |
| 820,216 | 5/1906 | Leffingwell et al. | 251/10 |
| 3,254,869 | 6/1966 | Easey | 251/4 |
| 492,580 | 2/1893 | Hadley | 251/9 X |
| 1,865,012 | 6/1932 | Jackson | 251/9 X |
| 2,825,333 | 3/1958 | Broman | 251/9 X |
| 2,935,088 | 5/1960 | Thompson et al. | 251/4 X |
| 3,497,175 | 2/1970 | Koland | 251/9 |

*Primary Examiner*—M. Cary Nelson
*Assistant Examiner*—Richard Gerard
*Attorney*—Robert L. Niblack ABSTRACT: A flow control device for flexible tubing to control and regulate the rate of flow of fluid through the tubing and comprising at least a pair of movable jaws engageable with the tubing and affixed to one member and a second member engageable with the jaws and movable along the longitudinal axis of the first member to thereby move the jaws into and out of engagement with the tubing when the second member is moved along the axis of the first member. The flow control device is particularly useful in administering liquids for intravenous feeding and other medical purposes.

PATENTED OCT 12 1971 3,612,474
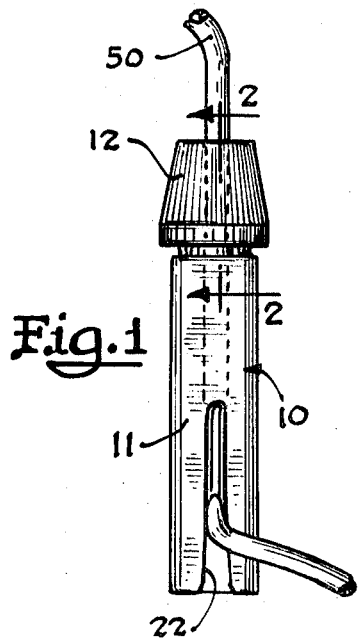
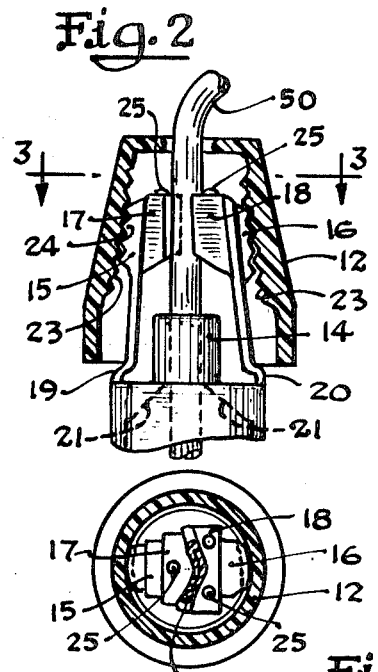
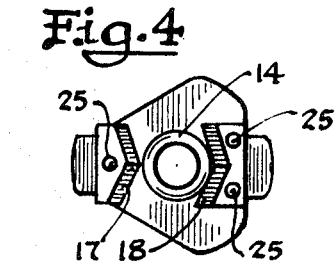
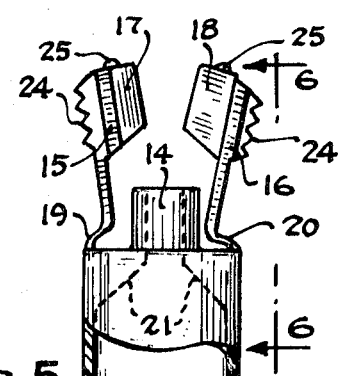
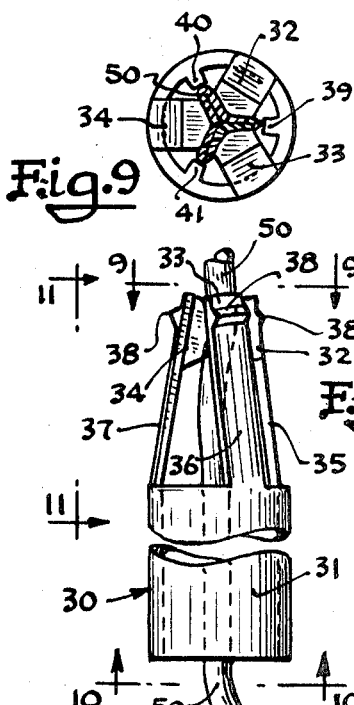
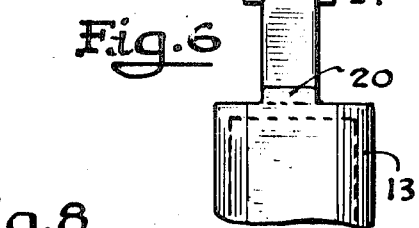
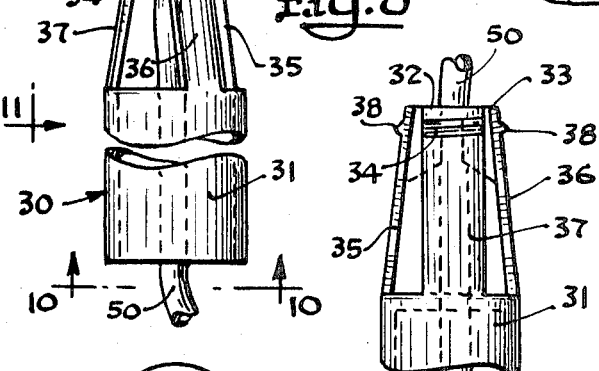
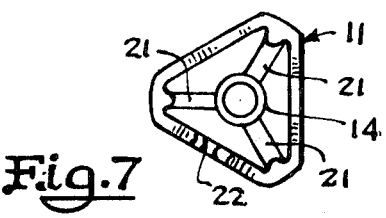
Inventor
Clair L. Strohl, Jr.
By Gildo E. Fato
Attorney

FLOW CONTROL DEVICE FOR FLEXIBLE TUBES

BACKGROUND OF THE INVENTION

This invention relates to flow control devices employed with flexible or compressible tubes and more particularly, to a flow control device for use on a flexible tube to regulate the rate of flow of fluid through the flexible tube.

In various surgical and medical procedures, it is oftentimes necessary to administer fluid intravenously. Such fluids are contained within a bottle, plastic bag or other container, and are dispensed through a tube and a cannula which is inserted into the vein of the recipient. In administering such fluids, the flexible tube is first opened to fill the entire tube with fluid and expel all gases from the tube and then completely closed before the cannula is inserted into a vein of the recipient. The tube is then partially opened to set an intravenous flow rate through the tube to provide the required amount of fluid to the recipient per unit of time. The particular fluid flow rate selected varies with the feeding time and the medical requirements of the patient being treated. With pediatric patients, for example, the flow rate is very low and small flow rate changes will seriously effect the pediatric patients' fluid balance. Various devices have been employed for regulating the rate of flow of fluid through such tubes, an example of which is the clamp employing a tapered slot as disclosed in U.S. Pat. No. 2,503,207. Other devices which are intended to provide incremental control of the intravenous fluid flow rate are disclosed in U.S. Pats. Nos. 2,653,787 and 3,167,299. It is oftentimes necessary for one individual to set up such an intravenous feeding procedure rapidly, hence, it is desirable that the flow control device or the clamp be possible of actuation with one hand, leaving the other hand free for other necessary operations.

SUMMARY OF THE INVENTION

The present invention relates to an improved flow control device for external use on a flexible or compressible tube for regulating the fluid flow rate through the tube. The device comprises a first member having at least a pair of jaws and through which the tube is inserted, and a second member engageable with the jaws and movable along the longitudinal axis of the first member to draw the jaws together or release them to effect fluid flow control through the tube. Preferably, one of the members is provided with a tapered surface engageable with the surface of the other member in a gripping manner so that when the second member is moved in the direction of the axis of the first member, the jaws are moved into and out of engagement with the tube to thereby regulate the rate of fluid flow through the tube.

In a more specific embodiment, the present invention comprises a first tubular member having at least two movable jaws affixed to one end thereof. Positioned over the jaws is a collet or second member, movable along the longitudinal axis of the tubular member and having a tapered internal surface. Thus, when the tubing is threaded through the tubular member, jaws and collet, the tubular portion can be grasped with one hand and the collet can be grasped by the thumb and index finger of the same hand. The flow control device is thus manipulatable with one hand, leaving the other hand free for other necessary operations. As the collet is moved along the longitudinal axis of the tubular member, the tapered internal surface, being engageable with the jaws, will move the jaws into and out of engagement with the tube to thereby regulate and control the flow of fluid through the tube. The flow control assembly of the present invention provides a device which can easily be manipulated with one hand to provide incremental control of the fluid flow rate through the tube, can be manufactured at low cost and is therefore disposable after use.

DRAWINGS

The construction and advantages of the present invention will be readily understood by reference to the following detailed description when considered in conjunction with the accompanying drawings, which illustrate the best mode presently contemplated for carrying out the present invention.

FIG. 1 is a perspective view of a flow control device constructed in accordance with the present invention;

FIG. 2 is a partial elevational view, in cross section, taken along the lines 2—2 of FIG. 1;

FIG. 3 is a cross-sectional view taken along the lines 3—3 of FIG. 2, and showing the flow control device in the closed position;

FIG. 4 is a top plan view of the body and jaw portion and showing the flow control device in the open position;

FIG. 5 is an elevational view partly in cross section illustrating the body and jaw portion of the flow control device;

FIG. 6 is a partial elevational view taken along lines 6—6 of FIG. 5;

FIG. 7 is an end view of the body portion of the flow control device as viewed along the lines 7—7 of FIG. 5;

FIG. 8 is a partial elevational view of another embodiment of the present invention;

FIG. 9 is a top view of the flow control device illustrated in FIG. 8, showing the device in the closed position;

FIG. 10 is a bottom elevational view of the device of FIG. 9 taken along the lines 10—10 of FIG. 8;

FIG. 11 is a partial elevational view of the device of FIG. 8 taken along the lines 11—11 of FIG. 8.

DETAILED DESCRIPTION

Referring to the drawings, FIG. 1 illustrates a flow control device 10 comprising a body portion 11 and a collet 12 which is movable along the longitudinal axis of the flow control device 10 as hereinafter described. In use, a flexible tube 50 is inserted through the flow control device 10 as illustrated in FIG. 1. FIG. 5 illustrates the body portion 11 of the flow control device 10 in greater detail. In the embodiment illustrated in FIGS. 1 through 7, the body 11 comprises an elongated tubular member 13 having a bore therethrough of greater diameter than the flexible tubing 50 with a tubular boss 14 extending from one end thereof through which the tubing 50 is inserted to position it properly between the jaws. On the same end of the tubular member 13 from which projects the tubular boss 14 and immediately adjacent thereto are affixed two jaws 15, 16 which may have various geometric configurations and which, in the illustrated embodiment, have configurations one of which can be considered a hammer 17 and the other an anvil 18. As illustrated in FIG. 3, the angular relationship between the faces of the hammer 17 or corresponding anvil 18 is about 120°. The geometric configuration of the opposing faces of the jaws 15, 16 may take various forms and need not necessarily be angular, however. For example, the faces may be formed in the shape of corresponding arcs or the jaws 15, 16 may simply be formed in the shape of blocks. To minimize plastic cold flow in the flexible tube 50 after extended periods of compression, which cold flow can result in varying flow rate through the tube at a particular flow rate setting, angular configurations are preferred and particularly a relatively sharp angle, such as 90°. The faces can be formed parallel to the longitudinal axis of the tube 50, as illustrated, or transverse thereto. In the illustrated embodiment, the jaws 15 and 16 are formed integrally with the tubular member 13 and are attached thereto by means of hinges 19 and 20. To assist in threading the flexible tubing 50 through the tubular boss 14, oblique shoulders 21 are formed internally in the end of the tubular member 13 adjacent to the boss 14 and act to guide the end of the tubing through the boss 14. If desired, a slot 22 can be formed in the wall of the tubular member 13 which can then be utilized for quick shutoff of flow through the tube 50, as illustrated in FIG. 1. FIG. 2 illustrates the collet portion 12 of the flow control device 10 in greater detail and shows its interrelationship with the jaws 15 and 16. As illustrated, the collet 12 has a tapered configuration and has threads 23 formed on the tapered internal surface thereof. The threads are engageable with corresponding threads 24 in the jaws 15 and 16.

The collet 12 is movable along the longitudinal axis of the flow control device 10 and hence, because of its tapered configuration, will move the jaws into or out of engagement with the flexible tube 50 to thereby control the fluid flow rate through the tube 50. While threads are generally preferred because of the ease of incremental control of flow rate which they provide, other designs such as frictional engagement, tongue and groove, may be employed, so long as a gripping engagement is provided.

Illustrated in FIGS. 8 through 11 is another embodiment of the present invention employing three movable jaws which are not threaded and are activated by a collet (not shown) which is moved along the longitudinal axis of the device in the manner described with reference to the device illustrated in FIGS. 1 through 7. Preferably, the collet is formed in the shape of a truncated cone, as is the collet 12 of the device of FIGS. 1 through 7, with a tapered internal surface engageable with the jaws. Other forms may be employed however, for example a thin collet, in the nature of a slip ring having a diameter less than the diameter of the body portion 30 may be used. Referring to FIGS. 8 and 9, there is shown the body portion 30 of a modified flow control device comprising a tubular member 31 with three jaws 32, 33 and 34 extending from one end thereof on flexible shafts 35, 36 and 37 molded integrally with the tubular member 31. To obtain an optimal geometrical deformation of the tube 50, as illustrated in FIG. 9, the jaws 32, 33 and 34 are formed in the configuration of a pointed hammer in the same manner as the jaw 15 of the device illustrated in FIGS. 1 through 7. As illustrated, the jaws 32, 33 and 34 have small nibs 38 projecting opposite the jaw to engage the internal surface of the collet (not shown), particularly in the closed position. To assist in guiding the tubing through the tubular portion 31 and position it evenly between the jaws 32, 33 and 34, small longitudinal ribs 39, 40 and 41 are formed in the internal surface of the tubular body portion 31.

In assembly and use, a free end of the tubing 50 is inserted through the body portion 11, jaws 15, 16 and collet 12 of the device of FIGS. 1 through 7 for example, prior to complete assembly of the fluid administration equipment (not shown) on which the flow control device 10 is to be used. The free end of the tubing 50 is then affixed to the plastic bag, cannula, etc. The flow control device 10 can then be positioned at any desired point along the length of the tubing 50. When it is desired to administer the fluid, the flow control device 10 can be opened completely by rotating the collet 12 to move the collet 12 longitudinally in the appropriate direction to thereby permit fluids to fill the tube 50 and expel all gases. The device 10 can then be closed to shut off all flow by rotating the collet 12 to move the collet 12 longitudinally until the jaws 15, 16 have compressed the tube 50 and stopped all flow of fluid, as illustrated in FIG. 3. Alternatively, with the flow control device illustrated in FIGS. 1 through 7, the tube 50 can be inserted in the slot 22 and drawn up into the narrow portion thereof to quickly shut off all flow. To set the desired rate of flow, the collet 12 is rotated in the appropriate direction to move the collet 12 longitudinally to engage or release the tube 50. As previously described, the entire operation can be completed with one hand.

The device of FIGS. 8 through 11 can be employed in a similar manner. Assembly of the flow control device with the fluid administration equipment is accomplished in the same manner as previously described. In use however, the collet (not shown) and jaws 32, 33 and 34 not having interengaging threads as does the device 10 in FIGS. 1 through 7, incremental control of the flow rate through the tube 50 is accomplished by moving the collet longitudinally toward or away from the body portion 31. In the previously described embodiment, the collet is likewise moved along the axis of the device 10, but because of the threads 23, 24, this is accomplished by rotating the collet 12. As the collet (not shown) is moved toward the body portion 31, for example, the flow rate through the tube 50 will be decreased since the tapered internal surface of the collet, which engages the jaws 32, 33 and 34, will compress the jaws 32, 33 and 34 against the tube 50 until the optimal geometrical deformation results, as illustrated in FIG. 9, and the flow of fluid is stopped. To achieve an intermediate flow rate, the collet can be withdrawn from the shutoff position until the desired flow rate is obtained and, because of the gripping engagement between the internal tapered surface of the collet and the jaws 32, 33, 34, the flow rate will be maintained. If a tubular collet having a fixed diameter is employed, such as the slip ring configuration previously described, then the flow rate is likewise regulated by moving the collet toward or away from the body portion 31. Being of a fixed diameter and less than the diameter of the body portion, as the collet is moved in either direction, it will apply or release pressure on the shafts 35, 36, 37 of the jaws 32, 33, 34 and thereby regulate the contact between the jaws 32, 33, 34 and the tube 50.

The flow control device 10, including the body 11 and collet 12, can be made from any suitable material such as polypropylene or polystyrene using conventional plastic fabrication techniques, such as injection or compression molding. It is desirable that the jaws 15 and 16 be molded integrally with the tubular portion 13 of the body 11, preferably with flexible hinges 19, 20 formed therein. Promptly after injecting the plastic and forming the body, including the jaws, it is advantageous to flex the hinges 19, 20 to orient the molecules of the plastic material to thereby strengthen the hinges 19, 20 against continuing stress. This can conveniently be done by forming the mold cavity for the jaws 19, 20 perpendicular to the axis of the mold cavity for the tubular portion 13. By forming undercuts in the mold cavity for the jaws 19, 20 corresponding to the nibs 25 in the jaws 15, 16 when the mold is separated after the body 11 is formed, the undercuts and corresponding nibs 25 will hold the jaws momentarily in the mold to flex the hinges, 19, 20 into a position substantially parallel with the axis of the tubular portion 13 to thereby orient the molecules. In such a method, the parting line of the mold is positioned at the uppermost portion of the body 11 so that, after the complete part is formed, the mold cavity for the body 11 can be held stationary while the mold cavity for the jaws 15, 16 is withdrawn. As the jaw mold is withdrawn, the hinges 19, 20 and jaws 15, 16 remain in the mold momentarily so that the hinges 19, 20 are flexed as previously described.

What is claimed is:

1. A flow control device for regulating the flow of fluid through a flexible tube and comprising: an elongated tubular member having a bore therethrough of greater diameter than the flexible tube, at least a pair of opposing jaws formed integrally with and extending from one end of the tubular member, and arranged for lateral movement relative to the axis of said tube, said opposing jaws having the configuration of a hammer and anvil, respectively, the angular relationship between the faces of the hammer or corresponding anvil being about 120° or less, said faces being positioned parallel to the longitudinal axis of the flexible tube, a collet having a tapered internal surface with threads formed therein engageable with corresponding threads formed in the jaws in their faces away from the tube engaging portions, the collet being rotatable when the threads are in engagement to move the collet along the longitudinal axis of the flow control device to thereby move the jaws into and out of engagement with the flexible tube to regulate the flow of fluid through the tube.

2. The flow control device of claim 1 which includes a slot formed in the wall of the tubular member for rapid shutoff of fluid flow.

3. The flow control device of claim 1 in which said opposing jaws are attached to the tubular member by means of hinges.

4. The flow control device of claim 1 in which a tubular boss extends from one end of the tubular element through which the tubing is inserted to position the tubing properly between said jaws and in which oblique shoulders are formed internally in the end of the tubular element adjacent to the boss to assist in guiding the tubing through said element.

5. A flow control device for regulating the flow of fluid through a flexible tube and comprising: an elongated tubular member having a bore therethrough of greater diameter than the flexible tube, at least a pair of opposing jaws formed integrally with and extending from one end of the tubular member and arranged for lateral movement relative to the axis of said tube, said jaws having faces, the angular relationship of which is about 120° or less, said faces being positioned parallel to the longitudinal axis of the flexible tube, a collet having a tapered internal surface with threads formed therein engageable with corresponding threads formed in the jaws in their faces away from the tube engaging portions, the collet being rotatable when the threads are in engagement to move the collet along the longitudinal axis of the flow control device to thereby move the jaws into and out of engagement with the flexible tube to regulate the flow of fluid through the tube.